July 28, 1970 P. C. GOLDMARK 3,522,371

APPARATUS FOR RECORDING AND REPRODUCING COLOR PICTURE INFORMATION ON A MONOCHROME RECORD

Filed Dec. 1, 1967 3 Sheets-Sheet 1

INVENTOR.
PETER C. GOLDMARK

BY

Brumbaugh, Free, Graves & Donohue his ATTORNEYS

INVENTOR.
PETER C. GOLDMARK
BY
Brumbaugh, Free, Graves & Donohue
his ATTORNEYS

July 28, 1970 P. C. GOLDMARK 3,522,371

APPARATUS FOR RECORDING AND REPRODUCING COLOR PICTURE INFORMATION ON A MONOCHROME RECORD

Filed Dec. 1, 1967

3 Sheets-Sheet 3

INVENTOR.
PETER C. GOLDMARK

BY

Brumbaugh, Free, Graves & Donohue his ATTORNEYS

United States Patent Office 3,522,371
Patented July 28, 1970

3,522,371

APPARATUS FOR RECORDING AND REPRODUCING COLOR PICTURE INFORMATION ON A MONOCHROME RECORD

Peter C. Goldmark, Stamford, Conn., assignor to Columbia Broadcasting System, Inc., New York, N.Y., a corporation of New York Filed Dec. 1, 1967, Ser. No. 687,223
Int. Cl. H04n 5/84
U.S. Cl. 178—5.4 21 Claims

ABSTRACT OF THE DISCLOSURE

Apparatus for recording and reproducing motion picture color information on a monochrome film, in which a first component of color information is used to modulate a carrier waveform signal that is recorded in a first series of longitudinally displaced frames on a monochrome film. A second component of color information is used to modulate the same or a different carrier signal which is to be recorded in a second series of frames alternating with the frames of the first series. The carrier frequency is a multiple of the horizontal line frequency used in recording the information so that each frame comprises a succession of mutually displaced transverse lines in which the tone density variations corresponding to the amplitude of carrier waveform are essentially in longitudinal alignment.

During reproduction, the lines in the respective frames of each series are scanned either simultaneously, or alternately by sampling, and the modulation detected to continuously present two color component signals which may be reproduced in a conventional television receiver. In addition, a representation of picture brightness information may be recorded in superimposed relation to the waveforms in each frame, with the picture brightness information having frequency components distinct from the carrier and carrier sidebands for frequency selective extraction during reproduction.

BACKGROUND OF INVENTION

Field of invention

This invention relates to the recording and reproduction of motion picture color information, and specifically, to apparatus and methods for recording, as a modulated carrier signal, separate components of color picture information in separate series of frames on a motion picture film, and to reproduction from such a record.

Description of prior art

There are several recently developed methods and proposals for recording color picture information on a monochrome film so that it may be reproduced using television scanning techniques. In one known scheme, the red component of color information derived from a color television camera is used to modulate a suppressed carrier at one given frequency, and the blue component of color picture information is used to modulate a suppressed carrier having a different frequency. The two carriers are then combined with the green component of color information and recorded in a raster pattern in each frame of a motion picture film. Since the carriers are suppressed, however, in order to avoid the problem of beat frequencies between the two carriers, the respective carriers are recorded in alternate interframe spaces on the film so that the red and blue modulating information may be recovered during playback.

Since, in that recording method, the separate reference carrier waveforms recorded in the interframe spaces are separated from the modulated suppressed carrier recorded in the frames, any nonlinearities or shifting of the film during recording or playback may cause a relative shift in the respective phases of the carriers, which results in the development of color component signals of the incorrect proportion. Moreover, apparatus for recording a motion picture record of this type requires recording devices which must lay down separate records of the two unmodulated color carriers in the interframe spaces.

In a vastly improved system disclosed in U.S. application Ser. No. 678,452, now U.S. Pat. 3,459,885, for "Color Picture Information Recording and Reproducing System," assigned to the assignee of the present invention, a single suppressed carrier, having a frequency that is a multiple of the line recording rate, is modulated in quadrature with I and Q or other color difference information. Each line of recorded information contains, in addition, a record of a reference carrier signal that is submultiple of the modulated carrier so that, during reproduction, signals at the reference and suppressed carrier frequencies may be combined to extract the carrier modulation.

SUMMARY OF THE INVENTION

The present invention provides an alternate recording and reproducing technique in which the necessity for separate records of the color or reference carrier waveforms is eliminated. Basically, this is accomplished by recording in a first series of frames on a suitable record strip, such as monochrome cinematographic film, a first record of a carrier waveform modulated in accordance with a first component of color information along a corresponding line of the original, and by recording in a second series of frames a second record of a carrier waveform modulated in accordance with a second component of the color information. Each frame of both series comprises a succession of mutually displaced information bearing strips or lines containing a record of the modulated carrier. Preferably, each frame also contains a superimposed record of brightness information, e.g., the green color component, and the carrier is a multiple of the line recording rate so that maximum and minimum amplitudes of the carrier, when unmodulated, form essentially a series of longitudinally extending lines. In this manner, cross-talk and signal interference resulting from straddling by the interrogating beam during reproduction is minimized.

In one form of recording apparatus in accordance with the invention, two carriers are employed, the first carrier being modulated by one color component, e.g., red, and the second carrier at a different frequency being modulated with another color component, e.g., blue. Both carriers, together with their sideband frequencies, occupy frequency bands that are mutually exclusive and separate from the frequency band occupied by the brightness information. Since only one of the carriers is recorded in any single frame, the brightness and color frequency bands share a much larger portion of the frequency spectrum than if all three were recorded in a single frame.

During reproduction, one frame of each frame series is scanned simultaneously, either in an alternate line-by-line fashion or with a dual or switched beam, to simultaneously present the two color components to a suitable reproducing system.

For a better understanding of these and other aspects of the invention, together with the objects and advantages thereof, reference should be made to the following detailed description of exemplary embodiments and to the drawings, in which:

BRIEF DESCRIPTION OF THE DRAWINGS

FIG. 1 illustrates schematically the basic apparatus for recording motion picture color information in accordance with the invention. For convenience, it will be assumed that the motion picture record to be recorded is a monochrome cinematographic film 10 transported from a supply reel 12, through a scanning zone 14 and onto a takeup reel 16, and that the information is derived from a suitable video source, such as a color television camera 18 viewing an original scene. In a well-known manner, the camera 18 receives synchronization and blanking signals from a synchronization generator 20 and scans the original subject in a conventional television raster sequence to develop video signals representing the red R, blue B and green G color components along each scanned line of the original. If desired, those primary color signals may be used directly or processed through a matrix to develop color difference signals, e.g., $(R-Y)$, $(B-Y)$, and Y. When R, B only are used directly, the matrix 22 may be omitted, and the G signal may be taken to represent luminance (brightness) information. For the purpose of clarity, it will be assumed in the following description that the primary colors R, B and G are used directly.

Figure 1:
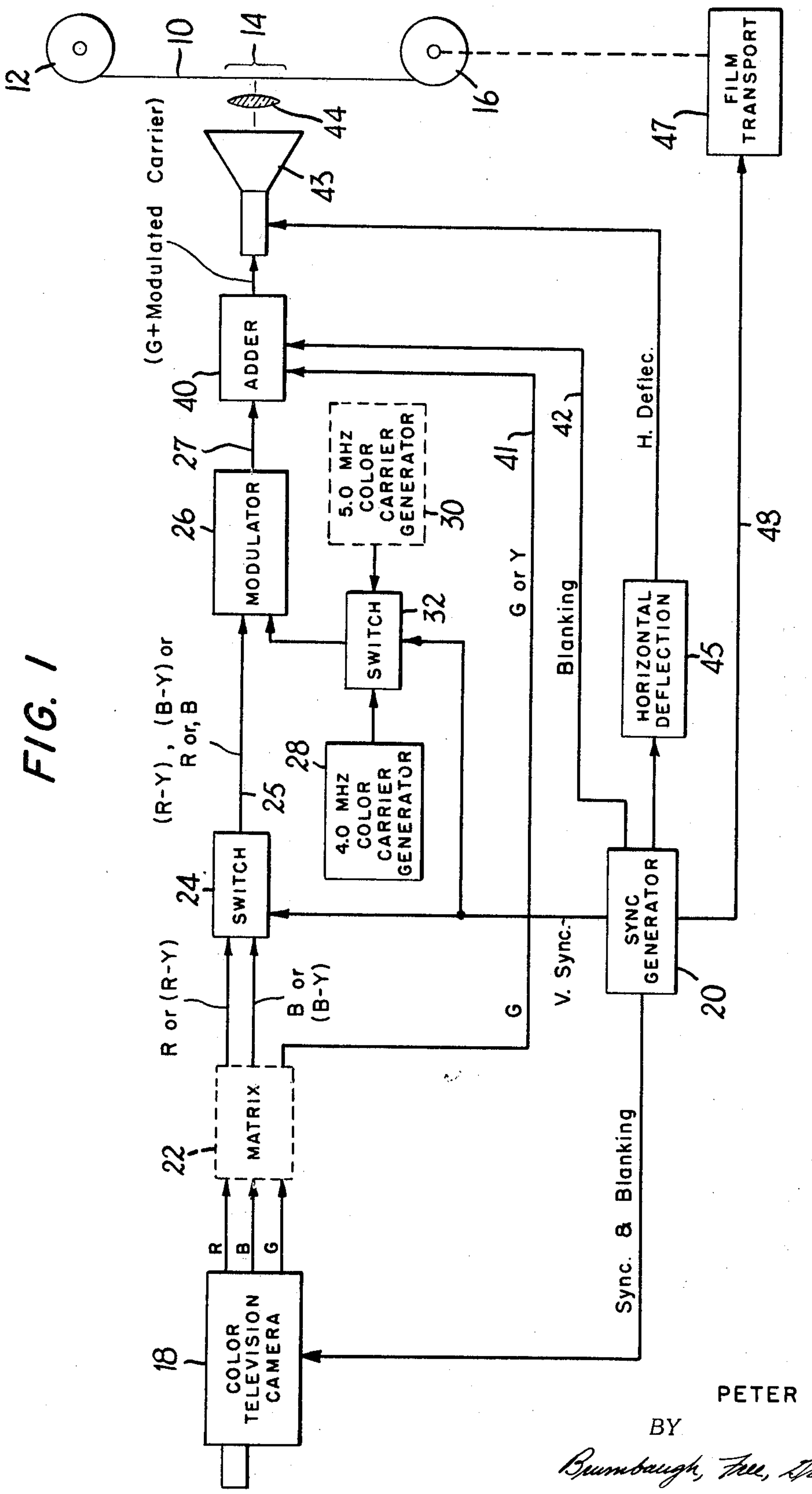
FIG. 1 is a schematic block diagram of apparatus for recording color motion picture information according to the invention.

A switch 24 providing a single output lead 25 and controlled by pulses from the generator 20, synchronized with the conventional vertical sync pulses, receives the two color component signals R, B. The switch therefore operates at the vertical repetition (field) frequency of the television camera 18 so that the R and B signals appear alternately on the conductor 25, each at a rate of, say, 30 c.p.s. During, for example, the first television field, the conductor 25 carries R information, whereas during the successive television field the conductor 25 bears B information.

The signals on the lead 25 are used as modulating component inputs to a conventional amplitude modulator 26, which may be of the balanced type to yield at its output 27 a suppressed modulated carrier waveform in which only the color carrier sidebands are present. Alternatively, the unit 26 may be a conventional modulator of the type presenting a modulated carrier frequency envelope at its output. The carrier signal input to the modulator 26 is derived from the color carrier generator 28, which yields a suitable periodic signal at a frequency (e.g., about 4.0 mHz.) that is a multiple of the horizontal line recording frequency $f_h$ and is separated from the brightness information band occupied by either of the modulating signals R, B, as depicted in FIG. 2.

In accordance with one aspect of this invention, however, the red and blue primary color components may be used to modulate respective different color carriers separated by the sum of the highest sideband frequencies of the red and blue signals. In this instance, a second color carrier generator 30 (indicated in phantom), producing a carrier waveform at a nominal frequency of 5.0 mHz., and the color generator 28 each feed a switch 32 of conventional design operating in synchronism with the switch 24 under control of the vertical synchronization pulses from the sync generator 20. Since the switching rates of the switches 24 and 32 are equal, the separate color carrier signals from the generators 28, 30 are consistently modulated by the same color information component. Thus, for example, when red information appears on the modulator input lead 25, the switch 32 selects the nominal 4.0 mHz. color carrier signal from the generator 28, and when the blue color information component is on the lead 25, the switch 32 selects the nominal 5.0 mHz. color carrier signal from the generator 30, and so on.

The signal frequency spectrum for either of the two alternatives discussed above is shown in FIG. 2. In graph (*a*), the brightness band 34, which may be occupied by a "mixed-highs" green G signal or purely luminance information Y, is seen to occupy a frequency band extending from 0 mHz. to approximately 3.5 mHz. Assuming that the highest frequency component in the modulating color component signal is about 500 kHz., the color carrier will be displaced from the brightness band by at least 500 kHz., or at about 4.0 mHz., and the color carrier sideband region extends between about 3.5 mHz. and 4.5 mHz. as shown by the curve 36. The precise frequency of the 4.0 mHz. carrier is a multiple of the horizontal frequency $f_h$ which, in the United States, is about 15.75 kHz. At a multiple of 256, the carrier frequency $fc_1$ equals 4.032 mHz.

Figure 2:
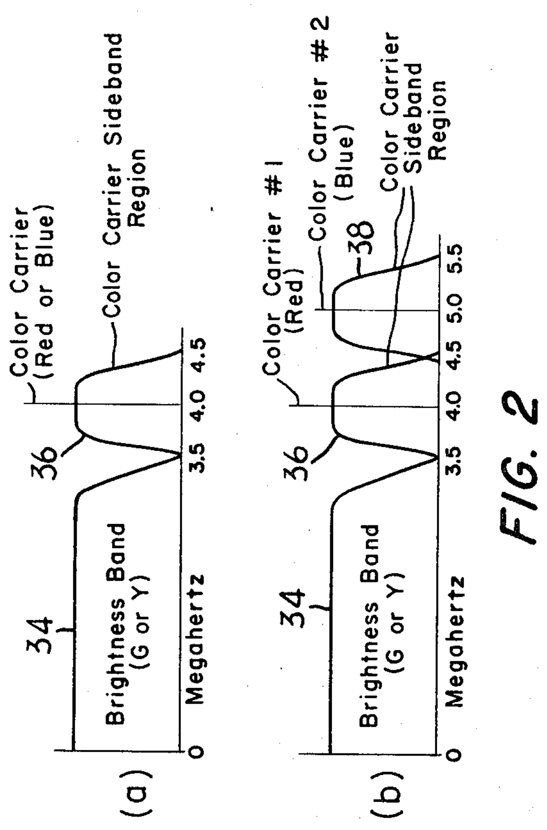
FIG. 2 is a graphical representation of the frequency bands occupied by the various components of picture information to be recorded.

In graph (*b*) of FIG. 2, representing the second alternative, the frequency relation between the brightness band 34 and the color carrier sideband region 36 surrounding the first color carrier is the same as that shown in gaph (*a*), i.e., 3.5 mHz.–4.5 mHz. Since a separate color carrier is employed for each primary color component, color carrier #2 appears at a frequency of about 5.0 mHz., assuming again that the highest frequency component in either of the primary color components is about 500 kHz. Precisely, the second carrier signal frequency may be 5.04 mHz. (15.75 kHz.$\times$320). The second color carrier sideband region, therefore, extends from about 4.5 mHz. to 5.5 mHz. so that the color carrier sideband regions surrounding each of the carriers are substantially mutually exclusive.

Returning to FIG. 1, the modulated color carrier signal at the output of the modulator 26 is next fed to an adder unit 40, which also receives the G signal on the conductor 41 (or the luminance Y signal, depending on which of those signals is selected to represent the brightness information in the original subject matter) and a blanking signal on the conductor 42 from the sync generator 20. From the adder 40, the composite signal, now containing brightness information and a modulated color carrier signal, is impressed on the intensity control electrode of a recording beam device, here represented by a cathode ray tube 43. It is understood of course, that other recording devices, such as an electron beam recording camera, may be used with equal or superior effectiveness. Suitable focusing of the CRT beam is provided by an optical lens 44. If electron beam recording is employed, focusing is provided by other conventional means, such as magnetic or electrostatic field focusing. Controlling the recording device 43 is a horizontal deflection signal from the unit 45, tied to the sync generator 20, to sweep the intensity-modulated recording beam transversely across the record medium 10, thus recording the color picture information in a succession of mutually displaced transverse lines across the film 10. In this regard, it should be noted that either a continuous or intermittent motion film transport mechanism 47, known in the art, may be used, the latter requiring conventional vertical deflection of the recording beam to form a raster pattern.

To the end of synchronizing the motion of the film 10 with the generation of signals at the color television camera 18, horizontal or vertical synchronization may be supplied from the generator 20 over the conductor 48 to the film transport mechanism 47 so that each frame is recorded with information from one television field. In the FIG. 1 system, every second frame is recorded with a color carrier modulated with red information, while the alternate frames are impressed with a record of the blue-modulated carrier. Each frame will contain, in addition, a pictorial representation of brightness information in the original scene.

Figure 3:
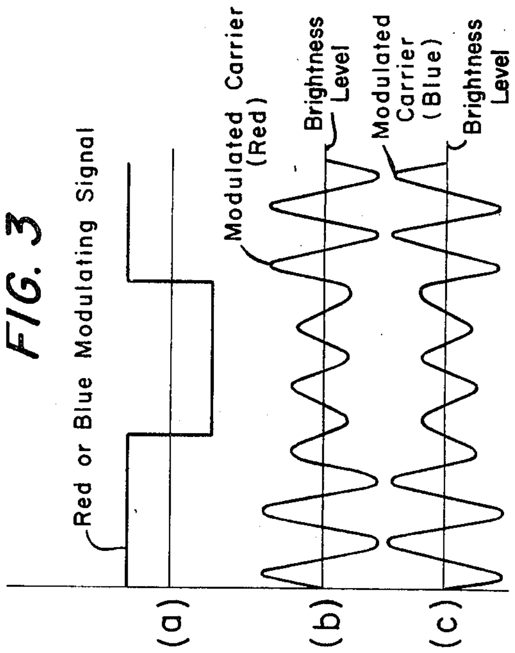
FIG. 3 is a series of graphs representing a carrier signal modulated with a component of color information to be recorded.

Graphs (*b*) and (*c*) of FIG. 3 represent the phase and amplitude relationship of the color carrier signal when modulated by a red or blue modulating signal shown arbitrarily in graph (*a*) as a squarewave. For purpose of illustration, it has been assumed that the color carrier is not suppressed and that the carrier signal modulated by red information is 180° out of phase with the carrier modulated with blue information. This phase relationship is desirable when only a single color carrier signal is used to carry both red and blue information. By reversing the phase of the color carrier in successive recorded film frames, it is possible to significantly reduce the line structure which tends to be present in the reproduced picture through cancellation of residual signal components at the color carrier frequency.

Figure 3A:
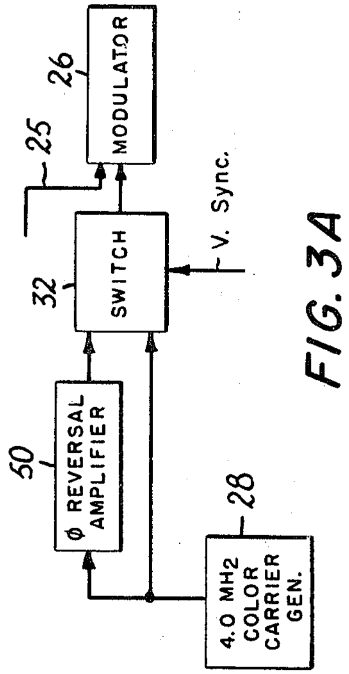
FIG. 3A is a schematic block diagram of electrical signal phase-reversal units which may be used in the FIG. 1 system.

A scheme for reversing the phase during the recording of alternate frames of the film 10 is shown schematically in FIG. 3A. As illustated, the signal from the color carrier generator 28 follows two paths, one directly to the switch 32 and another through a phase reversal amplifier 50, which imparts a 180° phase shift to the color carrier signal. (In this case, of course, the 5.0 mHz. carrier generator is not employed.) Since the switch 32 is controlled in synchronism with the vertical sync pulses from the generator 20, the color carrier signal input to the modulator 26 will be shifted by 180° during alternate television fields, and therefore during the recording of alternate frames of the film 10.

Figure 4:
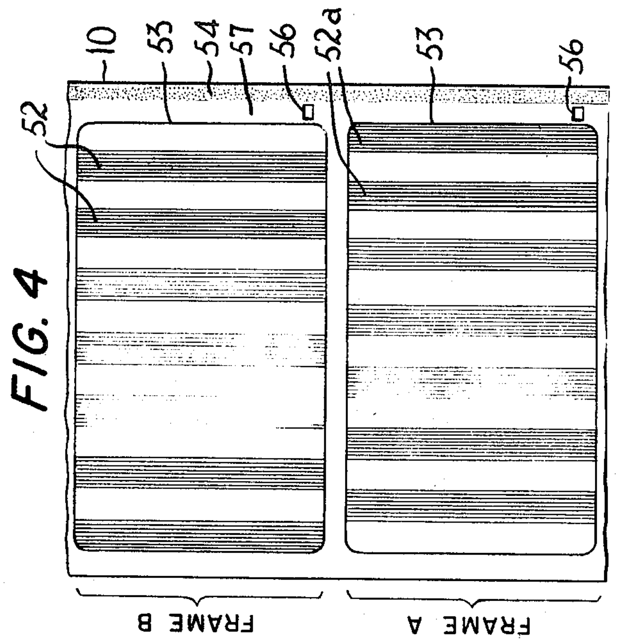
FIG. 4 is a plan view of a record medium recorded with the apparatus of FIG. 1, showing on an exaggerated scale the tone density patterns resulting from the recording of the signals shown in FIG. 3.

FIG. 4 represents, on a grossly exaggerated scale, the form that the film 10 assumes upon being recorded by the system of FIG. 1. The film takes the general form shown in the previously mentioned copending application Ser. No. 678,452, in which the recorded color carrier (or color carrier sideband signals) appear essentially as a seies of longitudinally extending parallel lines 52 in each of the recorded frames 53. Frames A and B represent the pictorial form of the recorded modulated carrier signals shown in graphs (*b*) and (*c*) of FIG. 3, respectively, the vertical line or bar pattern in frame B being displaced from the corresponding pattern in frame A due to the phase reversal of the carrier during alternate television field periods. The line or bar structure results, of course, from the fact that the recorded carriers are multiples of the line recording frequency so that regions of maximum and minimum optical density tend to be in vertical alignment.

The advantages of the film format of FIG. 4 are fully discussed in the foregoing copending application. In the present film, however, alternate frames A are recorded with a color carriage signal representing a single color information component (i.e., a primary color signal or a color difference signal), whereas the remaining alternate frames B are recorded with a different primary color component signal. For clarity, the signals shown in FIGS. 3(*b*) and 3(*c*) are referenced to the brightness level, as labeled, which is assumed to be constant. Accordingly, the film illustrated in FIG. 4 includes no pictorial brightness outlines, since the brightness is arbitrarily at a continuous level. The film shown in FIG. 4 may also contain a continuous optical or magnetic sound track 54 near one edge of the film, as well as small window-type synchronizing indicia 56 located accurately near the bottom (or top) of each frame 53 in the opaque frame border 57.

Figure 5:
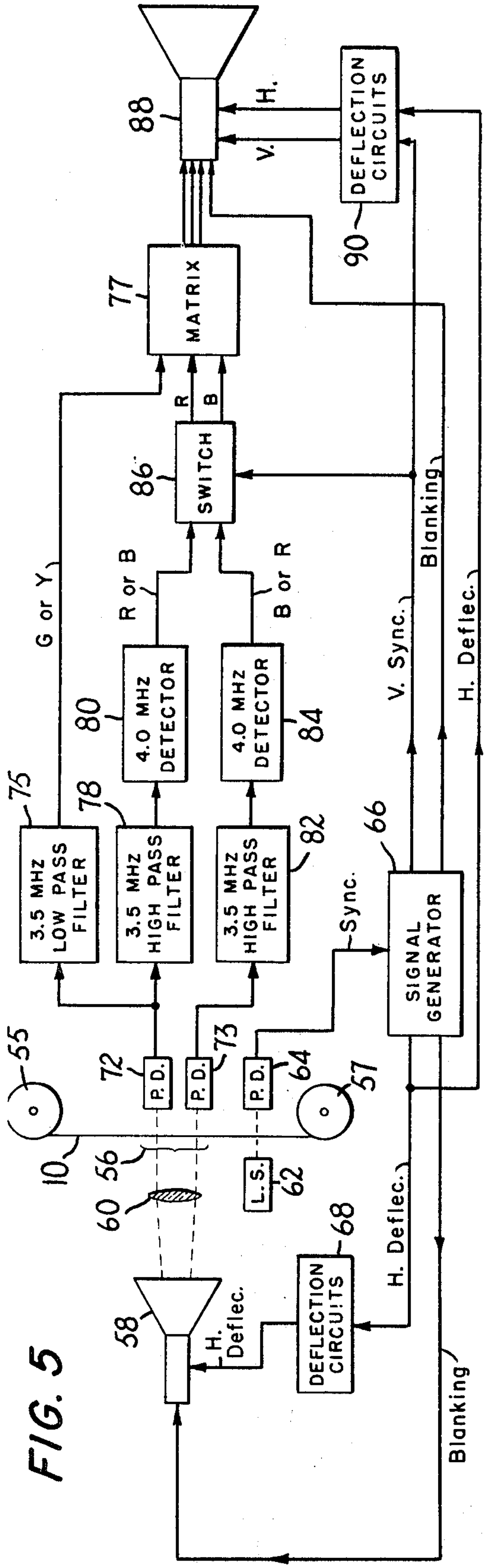
FIG. 5 is a schematic block diagram of one form of preferred apparatus for reproducing the color information from a record medium of the type shown in FIG. 4.

Although in the film shown the frames A and B are longitudinally displaced, they may be recorded in lateral displacement, e.g., side-by-side. In such case, the recording equipment of FIG. 5 is arranged such that the recording beam is displaced laterally to record the B (or A) frame of information. Alternatively, separate recording beams may be used to record frame series A and B.

In the record medium described in the abovenoted copending application, the color carrier signal is modulated in quadrature by two color component signals, such as I and Q, with the color carrier being suppressed. For this reason, that record medium also contains a record of a pilot carrier at a reference frequency to provide the reproducing equipment with a phase reference. In the present recording scheme, no pilot carrier is required, since each frame contains only one color information component and no phase modulation of the color carrier is performed. This has the advantage of permitting the brightness information to occupy the whole low-frequency band without interruption by a lower frequency pilot carrier. All brightness information is contained in a frequency band which is segregated from the color information band so that, during reproduction, the reproduced recorded signals may be easily separated using frequency selective components, now to be described.

Turning to FIG. 5, one system for reproducing color picture information from a film of the type shown in FIG. 4 is shown. The film 10 is arranged on a supply reel 55 for conveyance through a read-out scanning zone 56 to a take-up reel 57. In the scanning zone 56, the film is subjected to horizontal light beam traces from a dual trace scanning tube 58, focused by a lens system 60 on the plane of the film 10. The traces on the tube 58 are directed to impinge the film 10 at positions separated by approximately the pitch distance between adjacent frames. In this manner, one of the line scans will interrogate a line area of the film 10 containing red and brightness information (e.g., frame A in FIG. 4), whereas the other scan trace will interrogate a line area in an adjacent frame (e.g., frame B) containing both blue and brightness information.

A small light source 62 is arranged to direct a beam of light in a path described by movements of the small synchronizing indicia 56 on the film so that when one of the small indicia 56 passes the light source 62, it will be sensed by a photodetector 64 to develop a vertical synchronizing pulse. That pulse is routed to a signal generator 66, of conventional design, which in turn produces the necessary synchronization and blanking signals. For horizontal deflection, the signal generator may contain a free-running oscillator to produce the horizontal sweep signal. That sweep signal is provided through a conventional deflection circuit 68 to drive the horizontal deflection coil of the scanning tube 58.

In passing through the film, the light beam traces are modulated by the information contained in the film frames, and this modulation is sensed by a pair of photodetectors 72, 73, each of which is responsive to the light passing through a respective adjacent frame to convert it into a corresponding composite electrical signal. Each such electrical signal contains both the modulated color carrier (or color carrier sideband signal and frequency-unambiguous brightness signal. The composite signal from the photodetector 72 is next supplied to two filters, the first a 3.5 mHz. low-pass filter 75 which blocks all frequencies higher than 3.5 mHz. but allows the lower-frequency brightness signal component to pass through to a color matrix circuit 77. The other filter 78 is a 3.5 mHz. high-pass filter which permits frequencies in the color sideband region (36 in FIG. 2) to be transmitted to a 4.0 mHz. demodulation detector 80, but which impedes all frequency components of the signal lying in the brightness frequency band 34 between 0 mHz. and 3.5 mHz. Similarly, the signal from the photodetector 73 is passed through another high pass filter 82 identical to the filter 78, and from there to a separate 4.0 mHz. demodulation detector 84. Thus, the outputs of the detectors 80, 84 yield the red and blue color signals representing the original scenes recorded in adjacent pairs of film frames.

After passing through a switch 86 operated in synchronism with the rate of production of (vertical) synchronizing signals from the photodetector 64, the red and blue signals are fed to the matrix 77, along with the green (or Y) signal from the filter 75. The switch 86 operates to direct continuously the red and blue signals to the correct matrix input, the respective red and blue color signals appearing at the output of a different detector as the film moves through a distance of one frame pitch. From the matrix 77, the red, blue and green signals may be used to feed a conventional television receiver, represented by the kinescope 88, where the original scene is reconstituted.

It is apparent that the matrix 77 can be omitted if the R, B and G signals are correctly proportioned and G, rather than Y, represents the picture brightness.

Signals for synchronizing the operation of the raster produced on the kinescope 88 with the production of signals by the scanning system are derived from the signal generator 66, which provides blanking to the kinescope 88, and horizontal deflection and vertical synchronizing information to conventional deflection circuits 90. In this connection, it may be remarked that the vertical synchronizing pulse frequency from the signal generator 66 corresponds to the rate at which the synchronizing indicia on the film are sensed by the photodetector 64, and no complex generator in which the vertical and horizontal frequencies are rigidly locked is required. This synchronizing system is more fully described in U.S. Pat. No. 3,333,058, assigned to the assignee of the present invention.

Figure 6:
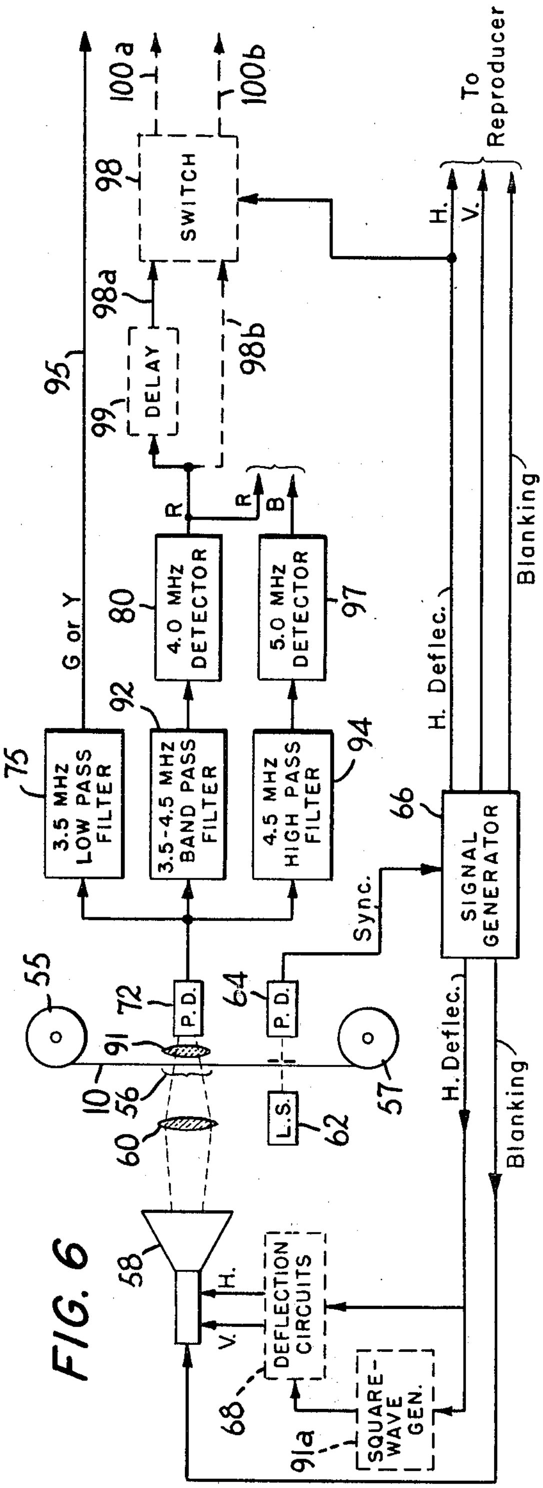
FIG. 6 is another preferred embodiment of reproducing apparatus for use in conjunction with a film strip of the type shown in FIG. 4.

FIG. 6 is an alternate reproducing system for use with films of the type shown in FIG. 4, in which either a single or two separate color carrier signals are employed. For convenience, the elements of the system identical to those in FIG. 5 have been labeled with the same identification numerals. This system differs basically from that shown in FIG. 5 in that a single photodetector 72 is employed to sense simultaneously modulation of the beam traces interrogating adjacent frames 53 on the film 10. In this connection, it will first be assumed that the scanning tube 58 is productive of conventional dual line-scan traces, existing simultaneously, and that the frequencies of the carrier signals recorded in adjacent frames of the film are nominally 4.0 mHz. and 5.0 mHz. An additional collecting lens 91 is employed behind the film and modulation by the information in adjacent frames is sensed by the single photodetector 72 which develops, therefore, a composite video signal containing (1) a brightness signal (G or Y), (2) the red-modulated 4.0 mHz. carrier and (3) the blue-modulated 5.0 mHz. carrier.

That composite video signal is fed simultaneously to the 3.5 mHz. low-pass filter 75, a 3.5–4.5 mHz. bandpass filter 92 and a 4.5 mHz. high-pass filter 94. Those units, by their frequency-selective characteristics, extract, respectively, the brightness information which appears continuously on the lead 95, the modulated 4.0 mHz. carrier which is fed to the detector 80, and modulation of the 5.0 mHz. carrier, which is directed to the 5.0 mHz. detector 97. The outputs of the detectors 80 and 97, therefore, will be electrical signals corresponding, respectively, to the red and blue color information in the original scene, and the red, blue and green (or Y) information may be fed directly to the reproducer. It should be remarked that those signals are continuously present at all times, as in the FIG. 5 arrangement, and no interline flicker will occur when the picture is reconstituted. In addition, no further switching or treatment of the signals is necessary.

When the FIG. 6 system is operated with a record medium recorded only with a brightness signal and the modulated 4.0 mHz. color carrier, then the filter 94 and detector 97 are not employed. In this instance, however, the scanning beam deflection system shown in phantom is employed, so that a single beam is switched alternately at the line scan rate between corresponding lines of adjacent frames of the film. To this end, a squarewave generator 91*a* feeding the vertical deflection circuit in the unit 68 receives the horizontal deflection signal to generate a square waveform synchronous with the horizontal line frequency $f_h$. This results in a switching of the beam between adjacent frames so that only one line of recorded signals is produced at a time. Therefore, the output of the detector 80 will comprise, alternately, the red and blue color signals in the alternately scanned lines, the red signal derived from one frame and the blue signal derived from an adjacent frame.

To the end of properly directing the red and blue color signals to the color television reproducer, the switch 98 is used. In this case, since the red and blue signals appear alternately at the line scan frequency $f_h$, it is feasible to delay the signal at the output of the detector 80 by an amount of time equal to the period of the horizontal deflection signal, i.e., $t_{delay}=1_{f_h}$. Thereafter, the delayed signal is introduced to one input terminal 98*a* of a switch 98, while the undelayed output of the detector 80 is simultaneously directed to a second input terminal 98*b*. Since the output signal at the detector 80 is always delayed by an amount corresponding to the horizontal scan period, red and blue information may be made to appear at the inputs 98*a*, 98*b* of the switch simultaneously. In order that the red and blue signals appear consistently at the correct output leads 100*a*, 100*b* of the switch, the switch is controlled in synchronism with the horizontal deflection signal from the generator 66, as shown. The system therefore can be made to supply both brightness and all color information continuously to the reproducer, even though the frames containing different components of color information are scanned alternately.

In the foregoing reproducing systems, very little deterioration in color brightness resolution is lost in the reproduced picture. From the foregoing, it is apparent that the present invention provides new alternatives and approaches to the recording and reproduction of color picture information using a monochrome film record. It combines the advantages of recording primary color information or a single color difference signal in separate frames or frame portions of a monochrome film with the other advantages of utilizing a color carrier signal, permitting the recording of both color and brightness information in the same frame of the film.

Although the invention has been described with reference to specific preferred embodiments, certain modifications and variations, both in form and detail, will occur to those skilled in the art. Accordingly, all such modifications and variations are intended to be included within the scope and spirit of the invention as defined in the appended claims.

I claim:

1. In apparatus for reproducing color motion picture information utilizing television scan techniques, the combination of:

a monochrome motion picture record containing first and second series of mutually displaced frames, each frame comprising a succession of mutually displaced information-bearing strips, the strips in the first frame series containing a first record of a carrier waveform modulated in accordance with a first component of color information along a corresponding line of the original scene, the strips in the second frame series containing a second record of a carrier waveform modulated in accordance with a second component of color information along the corresponding line of the scene;

means productive of a scanning beam of interrogating the strips of at least one frame of each series in a line-by-line sequence during a given period;

means for transporting the record through a scanning zone to present the one frame of each series to the scanning beam during the given period; and detector means responsive to modulation of the scanning beam by the modulated carriers in the strips scanned thereby to recover modulation of the carriers representing the respective first and second color components.

2. Apparatus as defined in claim 1, in which:

each strip in the respective frame series has an equal number of cyclic variations when the respective carrier is unmodulated, whereby the variations are in longitudinal alignment with the corresponding variations in the other strips in the frame.

3. Apparatus as defined in claim 1, in which:

each frame of the record medium contains, in addition, a superimposed record of a representation of brightness information in the original scene, the scanning beam being modulated in accordance therewith at frequencies separated from the carrier waveforme frequencies, and the detector means includes means for extracting the brightness information from modulation of the beam.

4. Apparatus as defined in claim 3, in which:

the brightness information representation comprises the green component of color information in the original.

5. Apparatus according to claim 3, in which the scanning means interrogates the strips of the one frame of each series alternately, and the detector means includes means responsive to modulation of the beam for developing a video carrier signal comprised of alternate segments of the carrier modulated by the respective first and second components, the apparatus further comprising:

means responsive to the video carrier signal for recovering modulation of the carriers, switch means connected to the modulation recovering means and operative at the strip scanning rate of the scanning means to provide at first and second output terminals only the respective first and second modulating components of color information for application to television reproducing means.

6. Apparatus as defined in claim 5, further comprising:

delay means connected in circuit with the detectors and modulation recovering means for alternately delaying the presentation of the respective first and second modulating components to the output terminals of the switch by an amount corresponding to the rate at which the beam scans the film strips.

7. Apparatus in accordance with claim 6, in which the frames of the first and second series alternate longitudinally and the scanning means comprises:

a scanning tube productive of a light beam sweeping transversely of the record medium, and deflection means for periodically switching the longitudinal position of the beam relative to the scanning zone at the beam sweep rate to scan the corresponding strips of the one frame in alternation.

8. Apparatus in accordance with claim 7, in which the deflection means includes:

first generator means for producing a periodic sweep signal for deflecting the scanning beam, and deflection signal generator means coupled to the first generator means for producing a squarewave deflection signal synchronized with the periodic sweep signal to switch the longitudinal position of the beam.

9. Apparatus as defined in claim 1, in which:

the first and second components of color information represent, respectively, first and second primary colors.

10. Apparatus as defined in claim 1, in which:

the first and second components of color information represent the difference between a brightness component of the picture and, respectively, red and blue information.

11. Apparatus as set forth in claim 1, in which the frames of the first and second series alternate longitudinally, the scanning means scans the corresponding strip of the one frames of each series simultaneously and the detector means includes:

first and second means responsive to the scanning means to develop first and second signals of the color components in the strips of adjacent frames on the record, and switch means receiving the first and second signals and operative at the rate at which the frames are transported through the scanning area to present continuously the respective signals at first and second terminals for application to television reproducing means.

12. Apparatus as defined in claim 1, in which:

the cyclic variations of the carrier waveforms in each strip of successive frames on the record are equal in number but are displaced a transverse distance equal to one-half the distance between adjacent cycles in each strip from one frame to the next.

13. Apparatus as set forth in claim 1, in which:

the carrier waveforms modulated by the respective first and second components have frequencies that are separated by an amount approximately equal to the sum of the maximum frequencies in those components.

14. Apparatus as defined in claim 13, in which the scanning means interrogates the corresponding strip of each frame simultaneously and the detector means comprises:

means responsive to the scanning means for developing a composite signal containing the first and second modulated carrier waveforms; and frequency selective means for extracting the first and second modulated carrier waveforms from the composite signal.

15. Apparatus as defined in claim 1, in which:

the first and second carrier waveforms are modulated in amplitude by the respective color information components.

16. Apparatus as defined in claim 1, in which each frame of the record medium contains, in addition, a superimposed record of a representation of brightness information in the original picture to modulate the scanning beam in accordance therewith, the brightness representation producing frequency components in the beam modulation distinct from the frequency components derived by scanning the first and second records, the detector means comprising:

means responsive to modulation of the beam to develop a composite signal, frequency selective means responsive to the composite signal to extract therefrom components representing the brightness information, and means responsive to the remaining components of the composite signal for recovering the modulating component of at least one of the carrier waveforms.

17. In apparatus for recording motion picture color information on a monochrome strip, the combination of:

television camera means for scanning in a line-by-line sequence an original scene to be recorded to develop first and second signals representing respective first and second color information components in the scene, means for modulating a carrier waveform as a function of one of the first and second signals;

means for transporting the record strip through a scanning zone, and recording means responsive to the modulated carrier waveform and productive of a periodically sweeping beam for recording on the record strip a first and second series of mutually displaced frames, each frame composed of a succession of mutualy displaced transverse lines, each line in the first series containing a record of the carrier waveform modulated with the first signal, each line of the second series containing a record of the carrier waveform modulated with the second signal.

18. Apparatus as set forth in claim 17, in which the television camera means develops, in addition, a signal representative of brightness information along the scanned lines of the original and occupying a frequency band distinct from the frequency components of the modulated carrier waveform recorded in the frames of the respective series, the apparatus further comprising:

means intermediate the recording means and the modulator means for combining the modulated carrier waveform and brightness signal, thereby to record brightness information in superposed relation to the first and second records.

19. Apparatus as defined in claim 17, in which:

the periodicity of the carrier waveform recorded in the first frame series is unequal to the periodicity of the carrier waveform recorded in the second series of frames.

20. Apparatus according to claim 19, in which:

the periodicity of each of the first and second carrier waveforms is a multiple of the line sweep rate of the recording beam.

21. Apparatus according to claim 20, in which the modulator means comprises:

first and second carrier signal generator means productive of first and second carrier signals having frequencies separated at least by an amount equal to the carrier sideband frequencies therebetween; and switch means synchronized with the rate at which the frames move through the scanning zone for alternately directing the respective modulated carrier waveforms to the recording means.

References Cited

UNITED STATES PATENTS

| | | | |
|---|---|---|---|
| 2,736,761 | 2/1956 | Sziklai | 178—6.7 |
| 2,736,762 | 2/1956 | Kell. | |
| 2,769,028 | 10/1956 | Webb. | |
| 3,354,264 | 11/1967 | Goldmark. | |
| 3,459,885 | 8/1969 | Goldmark. | |

ROBERT L. GRIFFIN, Primary Examiner

J. A. ORSINO, Jr., Assistant Examiner

U.S. Cl. X.R.

178—5.2, 6.7